April 23, 1968   I. JAY   3,378,946
FISH LURE DEVICE
Filed July 19, 1965
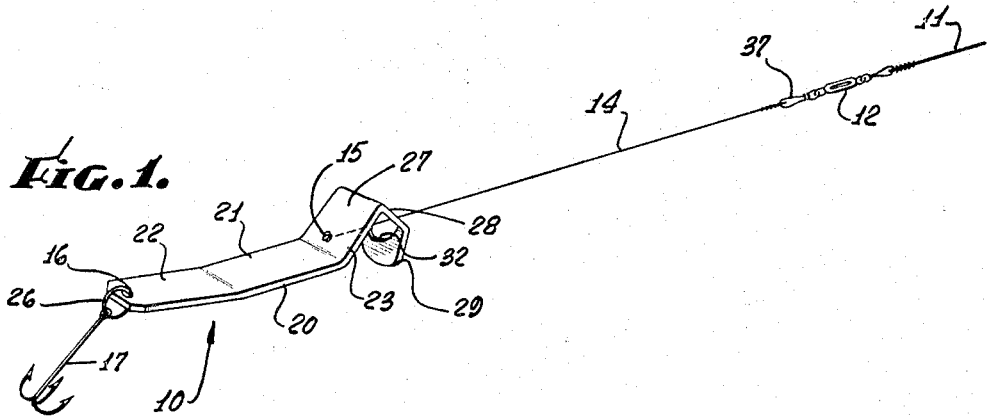
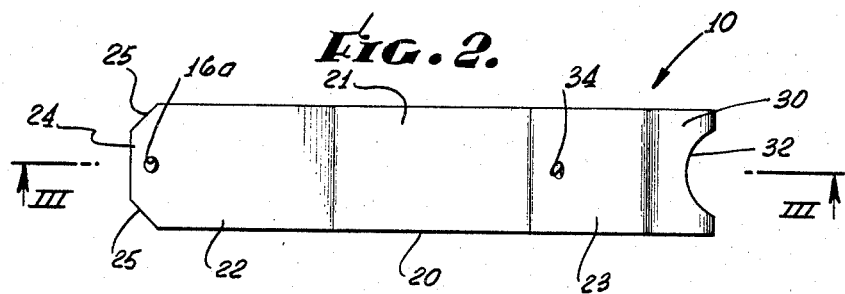
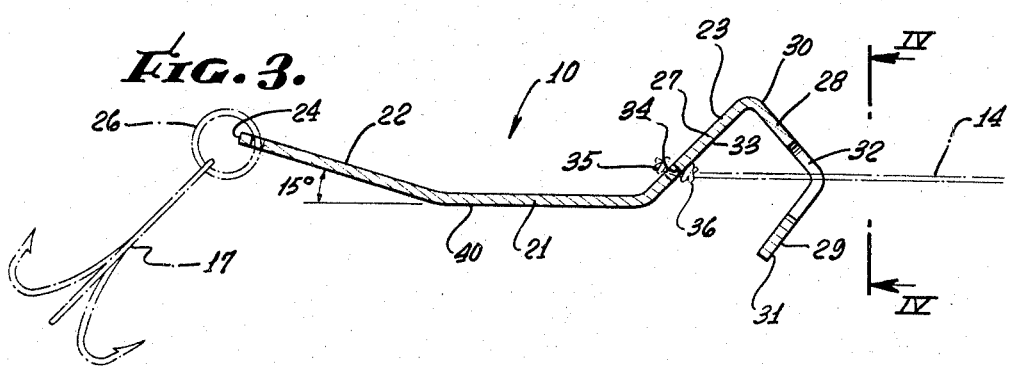
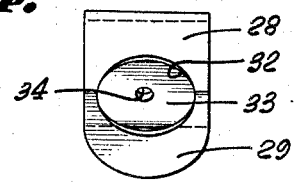
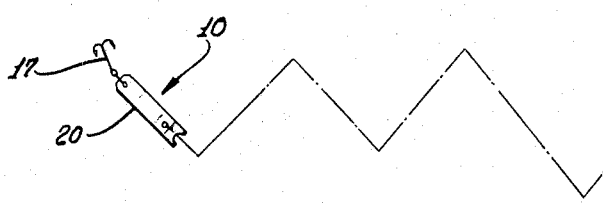
INVENTOR.
IRVIN JAY
By Miketta, Glenny, Poms & Smith
ATTORNEYS.

United States Patent Office 3,378,946
Patented Apr. 23, 1968

3,378,946
FISH LURE DEVICE
Irvin Jay, North Hollywood, Calif.
(5944 Calhoun, Van Nuys, Calif. 91401)
Filed July 19, 1965, Ser. No. 472,817
6 Claims. (Cl. 43—42.06)

ABSTRACT OF THE DISCLOSURE

A fish lure device adapted to move in an irregular and darting fashion in water including a central portion, a tail portion angularly disposed to the central portion, a head portion including at least three angularly disposed head sections a first one of which is angularly disposed and connected to the central portion, a second of which is angularly disposed to the first section and a third of which is angularly disposed to the second section. The intersection between the second and third sections having a port therein, and a wire-like leader element connected at one end to the first one of the head sections and passing through the port, whereby the connection between the leader element and the lure is rearward of the second and third sections of the head portion so that water passing through the port when the lure is drawn through the water will react upon the first section of the head portion causing the lure to move irregularly through the water.

---

This invention relates to a fish lure device and more particularly to a unitary simply constructed artificial fish lure adapted to simulate small live bait when the lure is in water and attached to a fish line.

It is generally believed that game fish are attracted to and do prefer live bait. However, use of live bait in fishing is restricted and prohibited by law in many fishing areas. Fishermen have therefore sought artificial fish lures or bait which were so constructed that when drawn through the water they would simulate the motion of a live bait, such as minnows and the like.

Consequently, many prior fish lure devices have been proposed which include some feature which attracts fish and which simulates a live bait in both appearance and action when in the water. Many of such prior fish lure devices were relatively expensive to manufacture, usually included several relatively movable parts which were connected together, and, in general, under certain fishing conditions were regarded as satisfactory.

The present invention contemplates a novel fish lure device made of simple one-piece construction, readily formed and bent to a desired shape and proportion, and provided with surfaces disposed to the direction of relative movement of the lure body to water such that a simulated live bait action is provided under various and different conditions of retrieve or when no retrieve is initially made. The fish lure device of this invention when in water provides a motion which resembles and simulates that of a live bait and under conditions of fast or normal retrieve speed the lure device darts about in the water, while under conditions of slow retrieve speed the lure device settles toward the bottom with a rocking motion simulating a live bait. The present invention contemplates a fish lure device which in addition to closely simulating live bait action and appearance provides mechanical advantages in handling and use.

The primary object of this invention therefore, is to disclose and provide a novel unitary fish lure device adapted for use under wide variation of fishing or water conditions.

Other objects of the invention are to disclose and provide a fish lure device of simple low cost construction and manufacture, attractive appearance, a lure device adapted for use with all game fish including fresh and salt water fish, a lure device usable in a wide number of sizes including fly rod size, and a lure body which provides simulated live bait motion and action at fast and slow retrieve, when the lure is held steady in a steam, when the lure is permitted to move with the stream or current, and when the lure is sinking after being cast and before retrieve action is started. Another object of the invention is to provide a fish lure device which will not twist the fish line during various retrieve conditions.

Many other objects and advantages of the present invention will be readily apparent from the following description of the drawings in which an exemplary embodiment of the invention is shown.

In the drawings:

FIG. 1 is a perspective view of a fish lure device embodying this invention provided with a fish hook and attached to a fish line.

FIG. 2 is a top plan view of the device shown in FIG. 1.

FIG. 3 is a longitudinal sectional view taken in a vertical plane bisecting the device as indicated by line III—III of FIG. 2.

FIG. 4 is a front view of the device shown in FIG. 3 and as indicated by line IV—IV of FIG. 3.

FIG. 5 is a schematic view of a path of travel taken by the lure device during a fast or normal retrieve action.

In FIG. 1 a fish lure device generally indicated at 10 embodying this invention is shown attached to a fish line 11 through a suitable connector 12 and a wire-like leader element 14 connected to the lure device 10 at 15 as more particularly hereinafter described. At the opposite end of device 10 may be connected at 16 a suitable fish hook 17.

The fish lure device 10 may comprise a fish lure body member 20 made of suitable lightweight metal flat strip stock of uniform width, relatively thin, and having flat surfaces on opposite faces thereof. Body member 20 may be cut to preselected length depending upon whether device 10 is to be used for fly fishing, fresh water fishing or salt water fishing and depending upon the size of the fish for which the bait is to be used. Thus, the length of body member 20 may vary from a fraction of an inch (fly fishing) to several inches. The strip stock may be of readily bendable and workable metal, such as steel which has sufficient weight for casting.

The lure body member 20 includes a central portion 21, a tail portion 22, and a head portion 23; each of said portions being of approximately the same over-all length as best shown in FIG. 2, that is, each portion may be about one-third (⅓) the length of body 20. Tail portion 22 may be bent upwardly at an angle of approximately 15° to the plane defined by central portion 21. If desired, the back edge 24 of tail portion 22 may be tapered at its corners as at 25. The perforation 16a adjacent the back edge 24 provides the connection 16 for a ring 26 to which the fish hook 17 may be attached in well known manner.

Head portion 23 may include three angularly disposed head sections 27, 28 and 29; head section 27 being integral with central portion 21 and being disposed at an angle thereto of approximately 45° to the plane of the central portion and extending in the same direction as tail portion 22. Head section 27 serves to connect and space head sections 28 and 29 from central portion 21, head sections 28 and 29 being angularly disposed with respect to each other and having the bisector of the angle defined thereby disposed proximate to and generally parallel with the forward prolongation of the longitudinal axis of the central portion. In this example, the vertex of the angle formed by sections 28 and 29 lies slightly above the plane of the central portion 21. The angle may be 90° or slightly greater. Head sections 28 and 29 present rearwardly and outwardly inclined front flat surfaces 30 and 31 which are interrupted at the angle formed by sections 28 and 29 by a circular port 32 having a diameter greater than one-half the width of body member 20. Port 32 permits flow of water therethrough for impingement of such water upon forwardly inclined flat surface 33 of head section 27.

A wire-like leader element 14 may be connected to head section 27 by a perforation 34 which receives a wire connector 35 providing a forward eye 36 to which the element 14 is pivotally attached, element 14 having at its forward end a suitable loop 37 providing attachment to the fish line connecting device 12. Wire element 14 is relatively thin and stiff and occupies little of the flow area of port 32. It will be apparent that pivotal movement of element 14 about eye 36 will be restricted by contact of intermediate portions of element 14 with the margins of the port 32.

In some instances fish lure body 20 may be provided with coatings of different color such as red, or silver to permit portions of the lure body to reflect light in the water. In one example, the bottom surface 40 of central portion 21 may be colored with silver or aluminum coating.

When fish lure device 10 is used in water, its normal position or attitude is that as indicated by FIG. 1. In such instance the wire element 14 extends parallel to the longitudinal axis of the central portion 21 of body member 20. As relative movement occurs between lure device 10 and water, as for example, when the lure device is retrieved at rapid speed the pressure force of water against inclined surfaces 31 and 33 will tend to overcome the downward pressure component of force of water acting upon the head section surface 30. Thus, there will be a tendency for vertical force components acting upon head section 23 to cause the head section to rise. Action of water upon tail portion 22 also tends to lift device 10 until element 14 contacts the lower edge of port 32. Some horizontal rocking thus occurs about the longitudinal axis of the device 10.

Water flowing through port 32 and striking the inclined surface 33 together with turbulent flow of water off surfaces 30 and 31 also produces a tendency for lure body 20 to move in a generally horizontal zig-zag path as diagrammatically indicated in FIG. 5. Such sideward zig-zag movement is permitted because of the wire leader 14 passing through port 32 and being connected to the head section 27 or to the lure body member 20 at a point approximately one-third of the length of the lure body from the forward extremity of body 20. Thus the pulling force of the fish line is applied not to the front end of the lure body but to a point intermediate its ends and force components acting forwardly of the pivot point on surfaces 30, 31, 33 produce movement of the lure body at an angle to the direction of pull of the fish line. Such angular movement is limited by element 14 contacting margins of the port 32. In actual use, it has been observed that the lure body after a series of zig-zag darts of generally uniform length will dart to one side for a length approximately twice as long as the previous dart lengths. It is thus apparent that the angular movement of the lure body in the water causes it to resemble a live bait.

When the speed of retrieve of the fish lure is relatively slow, the lure body is provided with a slight rocking action about its longitudinal axis. When the lure body is at rest in the water, that is, it may be settling in still water, the lure body settles downwardly with a similar rocking action. Thus, under various conditions of retrieving speed the motion imparted to the lure body by the particular disposition of the flat surfaces thereof and particularly the surfaces of the head section cause the lure body to resemble, simulate and give the appearance of a live bait in water.

It will be readily understood that if desired, selected small weights may be added to the lure body to facilitate casting and of course the particular type of fish hook 17 may be varied. The leader element 14 is preferably relatively stiff and is permanently attached to the head section 27. Thus, attachment of the fishing line 11 to the leader element 14 is conveniently performed with ample space between the front end of the lure body and the fish line connecting means 12. Relative stiffness of the wire leader element 14 is preferred so that the margins of port 32, when contacted by element 14, will serve to limit the angular disposition of the longitudinal axis of the fish lure body with respect to the axis of the fish line or wire leader element 14.

It will be readily understood that the manner in which the head portion 23 is provided with head sections in angular relation may be varied. The head sections 28 and 29 may be spaced from the forward end of central portion 21 by other constructions which provide inclined surfaces 33 so that the passage of water through port 32 will impinge upon an inclined surface forming a part of the lure body. The pivotal connection at 36 may be varied slightly in location but it is understood that it will be attached to the lure body at a point spaced from the most forward extremity of the fish lure body member 20. The angular relation between the head sections 27, 28 and 29 may also be slightly varied and the location of the bisector of the angle between head sections 28 and 29 may be located above or below the plane defined by the central body portion, and of course the angle between the head section 27 and 28 may be approximately 90° as shown.

It should also be noted that in use of the device described above, that during extremely fast retrieve speeds, the device 10 appears to resist tendencies to completely turn about its axis or spin or roll about its axis. Thus the fish lure device 10 will not cause twisting of the fish line 11.

Modifications and changes made in the fish lure device described above which come within the spirit of this invention and all changes and modifications coming within the scope of the appended claims are embraced thereby.

I claim:

1. A fish lure device adapted to move in an irregular and darting fashion in water comprising:
   an elongated flat surfaced uniformly wide lure body member including a central portion having a longitudinal axis;
   a tail portion upwardly inclined with respect to the central portion at about an angle of 15°;
   and a head portion including at least three angularly disposed head sections, one of said sections being disposed at an angle to said central portion and being integral therewith, the other two angularly disposed sections having the vertex of the angle defined thereby disposed proximate to the forward prolongation of the axis of the central portion and presenting rearwardly and outwardly inclined front surfaces, the said other two sections including a circular port having its axis at the vertex of the angle formed by said two sections;
   and a wire-like leader element connected at one end to the first mentioned head section adjacent the central portion and extending through said port, the margins of said port limiting angular displacement of said leader element with respect to the longitudinal axis of the central portion, said first mentioned head section presenting a flat inclined surface to the path of water flowing through said port when said lure body is drawn through water.

2. A fish lure device adapted to move in an irregular and darting fashion in water comprising:
   an elongated lure body member including a central portion having a longitudinal axis;
   a head portion and a tail portion disposed in angular relation to said axis;

said head portion including a pair of angularly disposed head sections defining at their vertex a rearwardly facing included angle having a bisector parallel and proximate to said axis, said head sections having a port through said bisector; and a leader element passing through said port and connected to said body member at a point adjacent said axis and rearwardly of said head sections.

3. A device as stated in claim 2 wherein said head portion includes a third head section connecting one of said pair of head sections to said central portion and located behind said port to present a flat surface to water passing through said port.

4. A body as stated in claim 3 wherein the over-all length of each of said central, tail and head portions is approximately equal.

5. A body as stated in claim 4 wherein said central, tail and head portions are of the same and uniform width and present flat surfaces.

6. A fish lure device adapted to move in an irregular and darting fashion in water comprising:

an elongated flat surfaced body member including a central portion having a longitudinal axis;

a tail portion upwardly inclined with respect to said central portion;

and a head portion including at least three angularly disposed head sections, a first section being disposed upwardly at an angle to said central portion and connected thereto, a second section being disposed downwardly at a substantially 90° angle to said first section and connected thereto, and a third section connected to said second section and disposed substantially parallel to said first section, the intersection between said second and third sections having a port therein;

and a wire-like leader element connected at one end to said first section of said head portion adjacent the central portion and extending through said port, said first head section presenting a flat inclined surface to the path of water flowing through said port when said lure body is drawn through water.

References Cited

UNITED STATES PATENTS

| | | | |
|---|---|---|---|
| 676,521 | 6/1901 | Weiss | 43—42.19 |
| 2,254,981 | 9/1941 | Sisco | 43—42.52 X |
| 3,127,694 | 4/1964 | Davis | 43—42.32 X |

SAMUEL KOREN, *Primary Examiner.*

WARNER H. CAMP, *Examiner.*